United States Patent

Lu et al.

(10) Patent No.: US 10,752,716 B2
(45) Date of Patent: Aug. 25, 2020

(54) COPOLYMERS AND TERPOLYMERS BASED ON CHLOROTRIFLUOROETHYLENE AND VINYL CHLORIDE AND USES THEREOF

(71) Applicant: HONEYWELL INTERNATIONAL INC., Morris Plains, NJ (US)

(72) Inventors: Changqing Lu, Amherst, NY (US); Pascal Bolomey, Solon, OH (US); Rajiv Ratna Singh, Getzville, NY (US); Paul Todaro, Williamsville, NY (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/978,103

(22) Filed: May 12, 2018

(65) Prior Publication Data

US 2018/0334519 A1  Nov. 22, 2018

Related U.S. Application Data

(60) Provisional application No. 62/505,326, filed on May 12, 2017.

(51) Int. Cl.
*C08F 214/24* (2006.01)
*C08F 214/06* (2006.01)

(52) U.S. Cl.
CPC .......... *C08F 214/24* (2013.01); *C08F 214/06* (2013.01); *C08F 2800/10* (2013.01); *C08F 2800/20* (2013.01)

(58) Field of Classification Search
None
See application file for complete search history.

(56) References Cited

U.S. PATENT DOCUMENTS

| | | | | |
|---|---|---|---|---|
| 2,396,713 A | | 3/1946 | Martin | |
| 2,770,615 A | * | 11/1956 | Kroncke, Jr. | C08F 214/08 526/231 |
| 2,915,506 A | * | 12/1959 | Honn | C08F 214/225 526/229 |
| 3,053,818 A | * | 9/1962 | Honn | C08F 214/22 526/227 |
| 3,579,491 A | * | 5/1971 | Carrega | C08F 14/06 526/184 |
| 4,515,927 A | * | 5/1985 | Gaylord | C08F 2/001 526/249 |
| 4,702,961 A | * | 10/1987 | Chung | C08K 5/098 428/379 |
| 6,369,178 B1 | * | 4/2002 | McCarthy | C08F 214/04 526/242 |
| 6,396,178 B1 | | 5/2002 | Chiu | |
| 6,759,131 B2 | * | 7/2004 | McCarthy | C08F 214/04 428/421 |
| 8,383,221 B2 | | 2/2013 | Muenster et al. | |
| 9,255,163 B2 | * | 2/2016 | Destarac | C08F 293/005 |
| 9,394,394 B2 | * | 7/2016 | Thenappan | C08F 214/242 |
| 2014/0087195 A1 | * | 3/2014 | Rainal | D21H 19/10 428/421 |

FOREIGN PATENT DOCUMENTS

| | | | | |
|---|---|---|---|---|
| EP | 0123044 A1 | * | 10/1984 | ......... C08F 214/06 |
| GB | 705422 A | * | 3/1954 | ......... C08F 14/24 |
| GB | 728557 A | | 4/1955 | |
| GB | 888014 A | * | 1/1962 | ............ C08F 2/46 |
| GB | 1104289 A | | 2/1968 | |
| GB | 1211336 A | | 11/1970 | |

OTHER PUBLICATIONS

Prober, "The Copolymerizationof Some Fluorinated Olefins", Journal of the American Chemical Society, 72(2), 1950, 1036-1037 (Year: 1950).*
J. Ulbricht et al. Plaste and Kautschuk, vol. 22, Issue 5, pp. 390-393, 1975 Synthesis of Vinyl Chloride and Trifluorochloroethylene Copolymers (Abstract only).
PCT/US2018/032478—International Search Report.

* cited by examiner

*Primary Examiner* — Nicole M. Buie-Hatcher
(74) *Attorney, Agent, or Firm* — Roberts & Roberts, LLP; Richard S. Roberts, Jr.

(57) ABSTRACT

Disclosed are copolymers and terpolymers chlorotrifluoroethylene and vinyl chloride having improved properties, and particularly a high glass transition temperature, for use in membranes, coatings, barrier films, and other applications and process for forming such copolymers and terpolymers, which are useful in reverse osmosis desalination, nanofiltration, ultrafiltration, microfiltration, membrane distillation, pervaporation, selective gas separation, batteries and fuel cells.

2 Claims, No Drawings

COPOLYMERS AND TERPOLYMERS BASED ON CHLOROTRIFLUOROETHYLENE AND VINYL CHLORIDE AND USES THEREOF

CROSS REFERENCE TO RELATED APPLICATIONS

The present invention is related to and claims the priority benefit of U.S. Provisional Application 62/505,326 filed May 12, 2017, which is incorporated herein by reference in its entirety.

FIELD OF THE INVENTION

The present technology relates to copolymers and terpolymers based on chlorotrifluoroethylene and vinyl chloride monomers and to the synthesis, composition, property, and uses thereof.

BACKGROUND

Polychlorotrifluoroethylene (PCTFE) is a semi-crystalline polymer with high transparency to visible light and excellent moisture barrier and oxygen barrier properties. PCTFE also has good chemical and thermal stability. However, PCTFE is not soluble in commonly used organic solvents, which prevents PCTFE from use in many applications, such as coatings and membranes. Polyvinyl chloride (PVC) is a low cost plastic polymer with good chemical stability, but it is brittle. Plasticizers are needed to improve PVC's flexibility and processability.

Chlorotrifluoroethylene (CTFE) has been copolymerized with different co-monomers, such as ethylene and vinylidene fluoride, to obtain the corresponding copolymers with the desired properties. Chlorotrifluoroethylene (CTFE) and vinyl chloride (VC) copolymer is one of these CTFE-based copolymers. Applicants have come to appreciate, however, that the prior CTFE/VC copolymers have certain disadvantages.

In U.S. Pat. No. 2,915,506, chlorotrifluoroethylene (CTFE)/vinylidene fluoride (VDF)/vinyl chloride (VC) terpolymers were disclosed. The presence of vinyl chloride in the terpolymers facilitated the ease of cross-linking or vulcanization to a degree not otherwise obtainable if only the copolymer of trifluorochloroethylene and vinylidene fluoride were to be processed. However, the synthesis and composition of chlorotrifluoroethylene/vinyl chloride copolymers is not addressed.

U.S. Pat. No. 4,515,927 discloses a process for suspension polymerization of vinyl chloride and chlorotrifluoroethylene. The object of the process disclosed in the '927 patent is to make a copolymer having a relatively constant weight ration of from about 75 to 95 weight percent vinyl chloride and from 5 to 25 weight percent chlorotrifluoroethylene that is independent of the conversion. The '927 patent discloses that vinyl chloride is known to be more reactive than chlorotrifluoroethylene and as a result the vinyl chloride tends to react more rapidly and the monomer mixture rapidly becomes vinyl chloride-poor. Prior processes, including the process of the '927 patent, therefore used the technique of adding vinyl chloride in a step-wise manner to reconstitute the initial ratio of the vinyl chloride to chlorotrifluoroethylene charge prior to reaching the conversion where the weight ratio of the vinyl chloride and chlorotrifluoroethylene in the copolymer changes. In the process of the '927 patent, the process begins with an initial charge of vinyl chloride in the reactor and then after the polymerization reaction is initiated, additional vinyl chloride was added in a total of from 2 to 5 stages in sufficient quantity to copolymerize from 1 to 20 percent by weight of the unreacted monomers prior to the next addition of vinyl chloride (see Examples 2-7). The process of Example 5 of the '927 patent, for example, utilizes a five-stage VC addition process and achieves an 81.2% overall yield of copolymer and produces a copolymer having a VC/CTFE weight ratio of 80/20, a molecular weight of 66,300, and a glass transition temperature (Tg) of about 33° C.

U.S. Pat. No. 4,702,961 discloses a method of melt processing stabilized vinyl chloride/chlorotrifluoroethylene copolymer with an organo-metal stabilizer using the process as disclosed in the '927 patent.

Applicants have found that the prior processes for producing VC/CTFE copolymers produce polymeric materials with certain disadvantages. For example, the copolymers produced in accordance with the teachings of the '927 patent have molecular weights below about 70,000 and glass transition temperatures that of about 33° C.-34° C. Applicants have found that it is possible to produce novel copolymers of VC and CTFE that have much higher molecular weights and glass transition temperatures than the copolymers produced by the prior process of the '927 patent. Furthermore, applicants have found that the higher molecular weight and higher Tg copolymers produced by the present invention have significant and important advantages in many applications compared to the copolymers of VC and CTFE produced by the prior processes.

SUMMARY OF THE INVENTION

The present invention includes copolymers of chlorotrifluoroethylene (CTFE) and vinyl chloride (VC) that have advantageous properties, and particularly relatively high glass transition temperatures and/or high molecular weights.

The invention includes copolymers of chlorotrifluoroethylene (CTFE) and vinyl chloride (VC) consisting essentially of chlorotrifluoroethylene monomeric units and vinyl chloride monomeric units, said copolymer having a Tg of from about 70° C. to about 87° C. For the purposes of convenience, copolymers according to this paragraph are sometimes referred to herein as Copolymer 1. For the purposes of glass transition temperature as described herein, this property is measured by a DSC Q200 instrument (TA) at a 10° C./min temperature increase (see B. Wunderlich, Thermal Analysis, Academic Press, 1990, pp. 417-431).

As the term is used herein "chlorotrifluoroethylene monomeric units" refers to portions of the polymer that are formed by the polymerization of CTFE.

As the term is used herein "vinyl chloride monomeric units" refers to portions of the polymer that are formed by the polymerization of VC.

The invention includes copolymers of chlorotrifluoroethylene (CTFE) and vinyl chloride (VC) consisting essentially of chlorotrifluoroethylene monomeric units and vinyl chloride monomeric units, said copolymer having a Tg of from about 75° C. to about 87° C. For the purposes of convenience, copolymers according to this paragraph are sometimes referred to herein as Copolymer 2.

The invention includes copolymers of chlorotrifluoroethylene (CTFE) and vinyl chloride (VC) consisting of chlorotrifluoroethylene monomeric units and vinyl chloride monomeric units, said copolymer having a Tg of from about 70° C. to about 87° C. For the purposes of convenience, copolymers according to this paragraph are sometimes referred to herein as Copolymer 3.

The invention includes copolymers of chlorotrifluoroethylene (CTFE) and vinyl chloride (VC) consisting of chlorotrifluoroethylene monomeric units and vinyl chloride monomeric units, said copolymer having a Tg of from about 75° C. to about 87° C. For the purposes of convenience, copolymers according to this paragraph are sometimes referred to herein as Copolymer 4.

The invention includes copolymers of chlorotrifluoroethylene (CTFE) and vinyl chloride (VC) consisting essentially of chlorotrifluoroethylene monomeric units and vinyl chloride monomeric units, said copolymer having a Tg of from about 70° C. to about 87° C., a molecular weight of from about 100,000 to about 300,000 and a surface energy of from about 30 to about 40 mJ/m2. For the purposes of convenience, copolymers according to this paragraph are sometimes referred to herein as Copolymer 5. For the purposes of molecular weight as described herein, this property is refers to weight average molecular weight as measured by gel permeation chromatography as described in detail herein. For the purposes of surface energy, this property is measured by water and diiodomethane contact angle measurements as described in detail hereinafter.

The invention includes copolymers of chlorotrifluoroethylene (CTFE) and vinyl chloride (VC) consisting essentially of chlorotrifluoroethylene monomeric units and vinyl chloride monomeric units, said copolymer having a Tg of from about 70° C. to about 87° C., a molecular weight of from about 140,000 to about 250,000 and a surface energy of from about 30 to about 40 mJ/m2. For the purposes of convenience, copolymers according to this paragraph are sometimes referred to herein as Copolymer 6.

The invention includes copolymers of chlorotrifluoroethylene (CTFE) and vinyl chloride (VC) consisting essentially of chlorotrifluoroethylene monomeric units and vinyl chloride mono-meric units, said copolymer having a Tg of from about 75° C. to about 87° C., a molecular weight of from about 140,000 to about 250,000 and a surface energy of from about 32 to about 38 mJ/m2. For the purposes of convenience, copolymers according to this paragraph are sometimes referred to herein as Copolymer 7.

The invention includes copolymers of chlorotrifluoroethylene (CTFE) and vinyl chloride (VC) consisting of chlorotrifluoroethylene monomeric units and vinyl chloride monomeric units, said copolymer having a Tg of from about 70° C. to about 87° C., a molecular weight of from about 100,000 to about 300,000 and a surface energy of from about 30 to about 40 mJ/m2. For the purposes of convenience, copolymers according to this paragraph are sometimes referred to herein as Copolymer 8.

The invention includes copolymers of chlorotrifluoroethylene (CTFE) and vinyl chloride (VC) consisting of chlorotrifluoroethylene monomeric units and vinyl chloride monomeric units, said copolymer having a Tg of from about 70° C. to about 87° C., a molecular weight of from about 140,000 to about 250,000 and a surface energy of from about 30 to about 40 mJ/m2. For the purposes of convenience, copolymers according to this paragraph are sometimes referred to herein as Copolymer 9.

The invention includes copolymers of chlorotrifluoroethylene (CTFE) and vinyl chloride (VC) consisting of chlorotrifluoroethylene monomeric units and vinyl chloride mono-meric units, said copolymer having a Tg of from about 75° C. to about 87° C., a molecular weight of from about 140,000 to about 250,000 and a surface energy of from about 32 to about 38 mJ/m2. For the purposes of convenience, copolymers according to this paragraph are sometimes referred to herein as Copolymer 10.

The invention includes copolymers of chlorotrifluoroethylene (CTFE) and vinyl chloride (VC) consisting essentially of from about 5 to about 50 percent by weight chlorotrifluoroethylene monomeric units and from about 50 to about 95 percent by weight vinyl chloride monomeric units, said copolymer having a Tg of from about 70° C. to about 87° C. For the purposes of convenience, copolymers according to this paragraph are sometimes referred to herein as Copolymer 11.

The invention includes copolymers of chlorotrifluoroethylene (CTFE) and vinyl chloride (VC) consisting essentially of from about 5 to about 50 percent by weight chlorotrifluoroethylene monomeric units and from about 50 to about 95 percent by weight vinyl chloride monomeric units, said copolymer having a Tg of from about 75° C. to about 87° C. For the purposes of convenience, copolymers according to this paragraph are sometimes referred to herein as Copolymer 12.

The invention includes copolymers of chlorotrifluoroethylene (CTFE) and vinyl chloride (VC) consisting essentially of from about 5 to about 50 percent by weight chlorotrifluoroethylene monomeric units and from about 50 to about 95 percent by weight vinyl chloride monomeric units, said copolymer having a Tg of from about 70° C. to about 87° C., a molecular weight of from about 140,000 to about 250,000 and a surface energy of from about 32 to about 38 mJ/m2. For the purposes of convenience, copolymers according to this paragraph are sometimes referred to herein as Copolymer 13.

The invention includes copolymers of chlorotrifluoroethylene (CTFE) and vinyl chloride (VC) consisting essentially of from about 5 to about 50 percent by weight chlorotrifluoroethylene monomeric units and from about 50 to about 95 percent by weight vinyl chloride monomeric units said copolymer having a Tg of from about 75° C. to about 87° C., a molecular weight of from about 140,000 to about 250,000 and a surface energy of from about 32 to about 38 mJ/m2. For the purposes of convenience, copolymers according to this paragraph are sometimes referred to herein as Copolymer 14.

The invention includes copolymers of chlorotrifluoroethylene (CTFE) and vinyl chloride (VC) consisting of from about 5 to about 50 percent by weight chlorotrifluoroethylene monomeric units and from about 50 to about 95 percent by weight vinyl chloride monomeric units, said copolymer having a Tg of from about 70° C. to about 87° C. For the purposes of convenience, copolymers according to this paragraph are sometimes referred to herein as Copolymer 15.

The invention includes copolymers of chlorotrifluoroethylene (CTFE) and vinyl chloride (VC) consisting of from about 5 to about 50 percent by weight chlorotrifluoroethylene monomeric units and from about 50 to about 95 percent by weight vinyl chloride monomeric units, said copolymer having a Tg of from about 75° C. to about 87° C. For the purposes of convenience, copolymers according to this paragraph are sometimes referred to herein as Copolymer 16.

The invention includes copolymers of chlorotrifluoroethylene (CTFE) and vinyl chloride (VC) consisting of from about 5 to about 50 percent by weight chlorotrifluoroethylene monomeric units and from about 50 to about 95 percent by weight vinyl chloride monomeric units, said copolymer having a Tg of from about 70° C. to about 87° C., a molecular weight of from about 140,000 to about 250,000 and a surface energy of from about 32 to about 38 mJ/m2.

For the purposes of convenience, copolymers according to this paragraph are sometimes referred to herein as Copolymer 17.

The invention includes copolymers of chlorotrifluoroethylene (CTFE) and vinyl chloride (VC) consisting of from about 5 to about 50 percent by weight chlorotrifluoroethylene monomeric units and from about 50 to about 95 percent by weight vinyl chloride monomeric units said copolymer having a Tg of from about 75° C. to about 87° C., a molecular weight of from about 140,000 to about 250,000 and a surface energy of from about 32 to about 38 mJ/m2. For the purposes of convenience, copolymers according to this paragraph are sometimes referred to herein as Copolymer 18.

The invention includes terpolymers of chlorotrifluoroethylene (CTFE), vinyl chloride (VC) and maleic acid consisting essentially of chlorotrifluoroethylene monomeric units, vinyl chloride monomeric units and maleic acid units, said copolymer having a Tg of from about 70° C. to about 87° C. For the purposes of convenience, terpolymers according to this paragraph are sometimes referred to herein as Terpolymer 1.

As the term is used herein "maleic acid monomeric units" refers to portions of the polymer that are formed by the polymerization of maleic acid or other units that produce maleic acid moieties in the terpolymer, such as maleic anhydride.

The invention includes terpolymers of chlorotrifluoroethylene (CTFE), vinyl chloride (VC) and maleic acid (MA) consisting essentially of chlorotrifluoroethylene monomeric units, vinyl chloride monomeric units and maleic acid monomeric units, said copolymer having a Tg of from about 75° C. to about 87° C. For the purposes of convenience, terpolymers according to this paragraph are sometimes referred to herein as Terpolymer 2.

The invention includes terpolymers of chlorotrifluoroethylene (CTFE), vinyl chloride (VC) and maleic acid consisting essentially of chlorotrifluoroethylene monomeric units, vinyl chloride monomeric units and maleic acid monomeric units, said copolymer having a Tg of from about 70° C. to about 87° C. For the purposes of convenience, terpolymers according to this paragraph are sometimes referred to herein as Terolymer 3.

The invention includes terpolymers of chlorotrifluoroethylene (CTFE), vinyl chloride (VC) and maleic acid consisting essentially of chlorotrifluoroethylene monomeric units, vinyl chloride monomeric units and maleic acid monomeric units, said copolymer having a Tg of from about 75° C. to about 87° C. For the purposes of convenience, terpolymers according to this paragraph are sometimes referred to herein as Terpolymer 4.

The invention includes terpolymers of chlorotrifluoroethylene (CTFE), vinyl chloride (VC) and maleic acid consisting essentially of chlorotrifluoroethylene monomeric units, vinyl chloride monomeric units and maleic acid monomeric units, said copolymer having a Tg of from about 70° C. to about 87° C., a molecular weight of from about 100,000 to about 300,000 and a surface energy of from about 30 to about 40 mJ/m2. For the purposes of convenience, terpolymers according to this paragraph are sometimes referred to herein as Terpolymer 5.

The invention includes terpolymers of chlorotrifluoroethylene (CTFE), vinyl chloride (VC) and maleic acid consisting essentially of chlorotrifluoroethylene monomeric units, vinyl chloride monomeric units and maleic acid monomeric units, said copolymer having a Tg of from about 70° C. to about 87° C., a molecular weight of from about 140,000 to about 250,000 and a surface energy of from about 30 to about 40 mJ/m2. For the purposes of convenience, terpolymers according to this paragraph are sometimes referred to herein as Terpolymer 6.

The invention includes terpolymers of chlorotrifluoroethylene (CTFE), vinyl chloride (VC) and maleic acid consisting essentially of chlorotrifluoroethylene monomeric units, vinyl chloride monomeric units and maleic acid monomeric units, said copolymer having a Tg of from about 75° C. to about 87° C., a molecular weight of from about 140,000 to about 250,000 and a surface energy of from about 32 to about 38 mJ/m2. For the purposes of convenience, processes according to this paragraph are sometimes referred to herein as Terpolymer 7.

The invention includes terpolymers of chlorotrifluoroethylene (CTFE), vinyl chloride (VC) and maleic acid consisting of chlorotrifluoroethylene monomeric units, vinyl chloride monomeric units and maleic acid monomeric units, said copolymer having a Tg of from about 70° C. to about 87° C., a molecular weight of from about 100,000 to about 300,000 and a surface energy of from about 30 to about 40 mJ/m2. For the purposes of convenience, processes according to this paragraph are sometimes referred to herein as Terpolymer 8.

The invention includes terpolymers of chlorotrifluoroethylene (CTFE), vinyl chloride (VC) and maleic acid consisting of chlorotrifluoroethylene monomeric units, vinyl chloride monomeric units and maleic acid monomeric units, said copolymer having a Tg of from about 70° C. to about 87° C., a molecular weight of from about 140,000 to about 250,000 and a surface energy of from about 30 to about 40 mJ/m2. For the purposes of convenience, processes according to this paragraph are sometimes referred to herein as Terpolymer 10.

The invention includes terpolymers of chlorotrifluoroethylene (CTFE), vinyl chloride (VC) and maleic acid consisting of chlorotrifluoroethylene monomeric units, vinyl chloride monomeric units and maleic acid monomeric units, said terpolymer having a Tg of from about 75° C. to about 87° C., a molecular weight of from about 140,000 to about 250,000 and a surface energy of from about 32 to about 38 mJ/m2. For the purposes of convenience, terpolymer according to this paragraph are sometimes referred to herein as Terpolymer 10.

The invention includes terpolymers of chlorotrifluoroethylene (CTFE), vinyl chloride (VC) and maleic acid (MA) consisting essentially of from about 5 to about 50 percent by weight chlorotrifluoroethylene monomeric units, from about 50 to about 95 percent by weight vinyl chloride monomeric units, and about 15 percent by weight or less of maleic acid monomeric units, said terpolymer having a Tg of from about 70° C. to about 87° C. For the purposes of convenience, terpolymer according to this paragraph are sometimes referred to herein as Terpolymer 11.

The invention includes terpolymer of chlorotrifluoroethylene (CTFE), vinyl chloride (VC) and maleic acid (MA) consisting essentially of from about 5 to about 50 percent by weight chlorotrifluoroethylene monomeric units, from about 50 to about 95 percent by weight vinyl chloride monomeric units, and about 15 percent by weight or less of maleic acid monomeric units, said terpolymer having a Tg of from about 75° C. to about 87° C. For the purposes of convenience, terpolymer according to this paragraph are sometimes referred to herein as Terpolymer 12.

The invention includes terpolymer of chlorotrifluoroethylene (CTFE), vinyl chloride (VC) and maleic acid (MA) consisting essentially of said terpolymer having a Tg of from about 70° C. to about 87° C., a molecular weight of from about 140,000 to about 250,000 and a surface energy of from about 32 to about 38 mJ/m2. For the purposes of convenience, terpolymer according to this paragraph are sometimes referred to herein as Terpolymer 13.

The invention includes terpolymer of chlorotrifluoroethylene (CTFE), vinyl chloride (VC) and maleic acid (MA) consisting essentially from about 5 to about 50 percent by weight chlorotrifluoroethylene monomeric units, from about 50 to about 95 percent by weight vinyl chloride monomeric units, and about 15 percent by weight or less of maleic acid monomeric units, said terpolymer having a Tg of from about 75° C. to about 87° C., a molecular weight of from about 140,000 to about 250,000 and a surface energy of from about 32 to about 38 mJ/m2. For the purposes of convenience, terpolymer according to this paragraph are sometimes referred to herein as Terpolymer 14.

The invention includes terpolymer of chlorotrifluoroethylene (CTFE), vinyl chloride (VC) and maleic acid (MA) consisting of from about 5 to about 50 percent by weight chlorotrifluoroethylene monomeric units, from about 50 to about 95 percent by weight vinyl chloride monomeric units, and about 15 percent by weight or less of maleic acid monomeric units, said terpolymer having a Tg of from about 70° C. to about 87° C. For the purposes of convenience, terpolymer according to this paragraph are sometimes referred to herein as Terpolymer 15.

The invention includes terpolymer of, vinyl chloride (VC) and maleic acid (MA) consisting of from about 5 to about 50 percent by weight chlorotrifluoroethylene monomeric units, from about 5 to about 50 percent by weight chlorotrifluoroethylene monomeric units, from about 50 to about 95 percent by weight vinyl chloride monomeric units, and about 15 percent by weight or less of maleic acid monomeric units, said terpolymer having a Tg of from about 75° C. to about 87° C. For the purposes of convenience, terpolymer according to this paragraph are sometimes referred to herein as Terpolymer 16.

The invention includes terpolymer of chlorotrifluoroethylene (CTFE), vinyl chloride (VC) and maleic acid (MA) consisting of from about 5 to about 50 percent by weight chlorotrifluoroethylene monomeric units, from about 5 to about 50 percent by weight chlorotrifluoroethylene monomeric units, from about 50 to about 95 percent by weight maleic acid monomeric units, and about 15 percent by weight or less of maleic acid monomeric units, said terpolymer having a Tg of from about 70° C. to about 87° C., a molecular weight of from about 140,000 to about 250,000 and a surface energy of from about 32 to about 38 mJ/m2. For the purposes of convenience, terpolymer according to this paragraph are sometimes referred to herein as Terolymer 17.

The invention includes terpolymer of chlorotrifluoroethylene (CTFE), vinyl chloride (VC) and maleic acid (MA) consisting of from about 5 to about 50 percent by weight chlorotrifluoroethylene monomeric units, from about 5 to about 50 percent by weight chlorotrifluoroethylene monomeric units, from about 50 to about 95 percent by weight vinyl chloride monomeric units, and about 15 percent by weight or less of maleic acid monomeric units, said terpolymer having a Tg of from about 75° C. to about 87° C., a molecular weight of from about 140,000 to about 250,000 and a surface energy of from about 32 to about 38 mJ/m2. For the purposes of convenience, terpolymer according to this paragraph are sometimes referred to herein as Terpolymer 18.

In each of the descriptions of Terpolymers 1-18 above, the amount of the maleic acid monomeric unit can be about 10% or less, and for the purposes of convenience, such terpolymers are referred to herein as Terpolymers 1A-18A, respectively.

In each of the descriptions of Terpolymers 1-18 above, the maleic acid and the maleic acid monomeric units may be replaced by a third monomer that improves the hydrophilicity of the terpolymer without detrimentally affecting the other advantageous properties of the terpolymer as described herein. In each of the descriptions of Terpolymers 1-18 above, the maleic acid and maleic acid monomeric units can be replaced by such a defined third monomer, and for the purposes of convenience, such terpolymers are referred to herein as Terpolymers 1B-18B, respectively.

In each of the descriptions of Terpolymers 1-18 above, the maleic acid may be replaced by a third monomer selected from the group consisting of methyl vinyl ether, ethyl vinyl ether, n-butyl vinyl ether, iso-butyl vinyl ether, cyclohexyl vinyl ether, hydroxy butyl vinyl ether, 1,4-cyclohexanedimethanol mono vinyl ether, 3-amino propyl vinyl ether, 1,4-butanediol divinyl ether, diethyleneglycol divinyl ether, 1,4-cyclohexanedimethanol divinyl ether, vinyl acetate, vinyl propionate, vinyl benzoate, vinyl chloroformate, vinyl cinnamate, vinyl alcohols, N-vinyl pyrrolidone, N-vinyl caprolactam, N-vinyl-imidazole, N-vinyl-N-methylacetamide, acrylic acid, methacrylic acid, methyl acrylate, methyl methacrylate, ethyl acrylate, ethyl methacrylate, benzyl acrylate, benzyl methacrylate, acrylamide, maleic acid, N-methyl maleimide, N-ethyl maleimide, methyl maleate, ethyl maleate, allyl amine, and combinations of two or more of these, and for the purposes of convenience, such terpolymers are referred to herein as Terpolymers 1C-18C, respectively.

The present invention also includes membranes, fibers, films, coatings and other articles that contain the inventive copolymers of the present invention, including any of Copolymers 1-18.

The present invention also includes membranes, fibers, films, coatings and other articles that contain the inventive copolymers of the present invention, including any of Copolymers 1-18.

The present invention also includes membranes, fibers, films, coatings and other articles that contain the inventive terpolymers of the present invention, including any of Terpolymers 1-18.

The present invention also includes membranes, fibers, films, coatings and other articles that contain the inventive terpolymers of the present invention, including any of Terpolymers 1A-18A.

The present invention also includes membranes, fibers, films, coatings and other articles that contain the inventive terpolymers of the present invention, including any of Terpolymers 1B-18B.

The present invention also includes, for use in membranes, fibers, films, coatings and other articles that contain the inventive terpolymers of the present invention, including any of Terpolymers 1C-18C.

The present invention also includes methods and processes that use the copolymers of the present invention, including any of Copolymers 1-18, that are able to advantageously improved by use of the articles made in accordance with the present invention, including separation processes such as reverse osmosis desalination, microfiltration, ultrafiltration, nanofiltration, membrane distillation, pervaporation, and selective gas separation.

The present invention also includes methods and processes that use the terpolymers of the present invention, including any of Terpolymers 1-18, Terpolymers 1A-18A, Terpolymers 1B-18B and Terpolymers 1C-18C that are able to advantageously improved by use of the articles made in accordance with the present invention, including separation processes such as reverse osmosis desalination, microfiltration, ultrafiltration, nanofiltration, mem-brane distillation, pervaporation, and selective gas separation.

The present invention also provides an inventive process of synthesizing copolymers comprising chlorotrifluoroethylene monomeric units and vinyl chloride monomeric units and/or terpolymers comprising chlorotrifluoroethylene monomeric units, vinyl chloride monomeric units and maleic acid units. The method includes: (a) providing an initial reaction medium containing chlorotrifluoroethylene monomers and vinyl chloride monomers in a CTFE:VC weight ratio of from about 50:50 to about 5:95; and (b) reacting said chlorotrifluoroethylene monomers and vinyl chloride monomers under conditions to produce a copolyomer or terpolymer comprising vinyl chloride monomeric units in a weight percentage (based on the total weight of the copolymer or terpolymer produced) within 20 percent of the weight percentage of VC monomers in the initial reaction medium. For the purposes of convenience, processes according to this paragraph are sometimes referred to herein as Process 1.

The present methods also include: (a) providing an initial aqueous reaction medium containing at least one free radical initiator and chlorotrifluoroethylene monomers and vinyl chloride monomers in a CTFE:VC weight ratio of from about 50:50 to about 5:95; and (b) reacting said chlorotrifluoroethylene monomers and vinyl chloride monomers under conditions to produce a copolyomer or terpolymer comprising vinyl chloride monomeric units in a weight percentage (based on the total weight of the copolymer or terpolymer produced) within 15 percent of the weight percentage of VC monomers in the initial reaction medium, wherein said conditions include conducting said reaction at temperatures in the range of from about 20C to about 50C for a period of at least about 15 hours. For the purposes of convenience, processes according to this paragraph are sometimes referred to herein as Process 2.

The present methods also include: (a) providing an initial aqueous reaction medium containing at least one free radical initiator and chlorotrifluoroethylene monomers and vinyl chloride monomers in a CTFE:VC weight ratio of from about 50:50 to about 5:95; and (b) reacting said chlorotrifluoroethylene monomers and vinyl chloride monomers under conditions to produce a copolyomer or terpolymer comprising vinyl chloride monomeric units in a weight percentage (based on the total weight of the copolymer or terpolymer produced) within 10 percent of the weight percentage of VC monomers in the initial reaction medium, wherein said conditions include conducting said reaction at temperatures in the range of from about 20C to about 50C for a period of at least about 15 hours to produce a copolymer having a glass transition temperature of from about 70° C. to about 87° C. For the purposes of convenience, processes according to this paragraph are sometimes referred to herein as Process 3.

The present methods also include: (a) providing an aqueous reaction medium containing at least one free radical initiator and chlorotrifluoroethylene monomers and vinyl chloride monomers in a CTFE:VC weight ratio, based on the total of the CTFE and VC monomers introduced to the reaction medium, of from about 50:50 to about 5:95; and (b) reacting said chlorotrifluoroethylene monomers and vinyl chloride monomers under conditions to produce a copolyomer or terpolymer comprising vinyl chloride monomeric units in a weight percentage that is within 5 percent of the weight percentage of said VC monomers introduced to the reaction medium (based on the total of monomers introduced to the reaction medium). For the purposes of convenience, processes according to this paragraph are sometimes referred to herein as Process 4.

The present methods also include: (a) providing an aqueous reaction medium containing at least one free radical initiator and chlorotrifluoroethylene monomers and vinyl chloride monomers in a CTFE:VC weight ratio, based on the total of the CTFE and VC monomers introduced to the reaction medium, of from about 50:50 to about 5:95; and (b) reacting said chlorotrifluoroethylene monomers and vinyl chloride monomers under conditions to produce a copolyomer or terpolymer comprising vinyl chloride monomeric units in a weight percentage that is within 5 percent of the weight percentage of said VC monomers introduced to the reaction medium (based on the total of monomers introduced to the reaction medium), wherein said conditions include conducting said reaction at temperatures in the range of from about 20C to about 50C for a period of at least about 15 hours to produce a copolymer having a glass transition temperature of from about 70° C. to about 87° C. For the purposes of convenience, processes according to this paragraph are some-times referred to herein as Process 5.

The present methods also include: (a) providing an aqueous reaction medium containing at least one free radical initiator and chlorotrifluoroethylene monomers and vinyl chloride monomers in a CTFE:VC weight ratio, based on the total of the CTFE and VC monomers introduced to the reaction medium, of from about 50:50 to about 5:95; and (b) reacting said chlorotrifluoroethylene monomers and vinyl chloride monomers under conditions to produce a copolyomer or terpolymer comprising vinyl chloride monomeric units in a weight percentage that is within 2 percent of the weight percentage of said VC monomers introduced to the reaction medium (based on the total of monomers introduced to the reaction medium). For the purposes of convenience, processes according to this paragraph are sometimes referred to herein as Process 6.

The present methods also include: (a) providing an aqueous reaction medium containing at least one free radical initiator and chlorotrifluoroethylene monomers and vinyl chloride monomers in a CTFE:VC weight ratio, based on the total of the CTFE and VC monomers introduced to the reaction medium, of from about 50:50 to about 5:95; and (b) reacting said chlorotrifluoroethylene monomers and vinyl chloride monomers under conditions to produce a copolyomer or terpolymer comprising vinyl chloride monomeric units in a weight percentage that is within 2 percent of the weight percentage of said VC monomers introduced to the reaction medium (based on the total of monomers introduced to the reaction medium), wherein said conditions include conducting said reaction at temperatures in the range of from about 20C to about 50C for a period of at least about 15 hours to produce a copolymer having a glass transition temperature of from about 70° C. to about 87° C. For the purposes of convenience, processes according to this paragraph are some-times referred to herein as Process 7.

The present methods also include: (a) providing an aqueous reaction medium containing at least one free radical initiator and chlorotrifluoroethylene monomers and vinyl chloride monomers in a CTFE:VC weight ratio, based on the total of the CTFE and VC monomers introduced to the reaction medium, of from about 50:50 to about 5:95; and (b) reacting said chlorotrifluoroethylene monomers and vinyl chloride monomers under conditions to produce a copolyomer or terpolymer comprising vinyl chloride monomeric units in a weight percentage that is within 1 percent of the weight percentage of said VC monomers introduced to the reaction medium (based on the total of monomers introduced to the reaction medium). For the purposes of convenience, processes according to this paragraph are sometimes referred to herein as Process 8.

The present methods also include: (a) providing an aqueous reaction medium containing at least one free radical initiator and chlorotrifluoroethylene monomers and vinyl chloride monomers in a CTFE:VC weight ratio, based on the total of the CTFE and VC monomers introduced to the reaction medium, of from about 50:50 to about 5:95; and (b) reacting said chlorotrifluoroethylene monomers and vinyl chloride monomers under conditions to produce a copolyomer or terpolymer comprising vinyl chloride monomeric units in a weight percentage that is within 1 percent of the weight percentage of said VC monomers introduced to the reaction medium (based on the total of monomers introduced to the reaction medium), wherein said conditions include conducting said reaction at temperatures in the range of from about 20C to about 50C for a period of at least about 15 hours to produce a copolymer having a glass transition temperature of from about 70° C. to about 87° C. For the purposes of convenience, processes according to this paragraph are some-times referred to herein as Process 9.

The present invention includes copolymers, including any of Copolymers 1-18, produced according to the processes of the present invention, including any of Process 1-9.

The present invention includes terpolymers, including any of Terpolymers 1-18, Terpolymers 1A-18A, Terpolymers 1B-18B, Terpolymers 1C-18C, produced according to the processes of the present invention, including any of Process 1-9.

The present invention includes terpolymers, including any of Terpolymers 1-18 and Terpolymers 1A-18A, produced according to the processes of the present invention, including any of Process 1-9 wherein said step of providing an aqueous reaction medium comprises providing an aqueous reaction medium further containing at least maleic acid or maleic anhydride and wherein said step of reacting includes reacting said chlorotrifluoroethylene monomers and said vinyl chloride monomers and said maleic acid or anhydride.

The present invention includes terpolymers, including any of Terpolymers 1-18, Terpolymers 1B-18B and Terpolymers 1C-18C, produced according to the processes of the present invention, including any of Process 1-9 wherein said step of providing an aqueous reaction medium comprises providing an aqueous reaction medium further containing at least one of said third monomers and wherein said step of reacting includes reacting said chlorotrifluoroethylene monomers and said vinyl chloride monomers and at least one of said third monomers.

DETAILED DESCRIPTION

The copolymers and terpolymers according to the present invention are formed by polymerization reactions comprising reacting chlorotrifluoroethylene monomers and vinyl chloride monomers in a reaction medium. The present invention provides a copolymer of chlorotrifluoroethylene and vinyl chloride and a terpolymer of CTFE, VC and MA.

In preferred embodiments the chlorotrifluoroethylene monomers and vinyl chloride monomers, and maleic acid monomers or third polymers when present, are polymerized in aqueous solution using a water-soluble initiator or a water-soluble redox initiator system to obtain CTFE/VC copolymers or CTFE/VC/MA terpolymers or CTFE/VC/Third monomer terpolymers with high glass transition temperatures. The aqueous solution can be free of suspension agents or emulsifiers.

The present invention provides a copolymer comprising chlorotrifluoroethylene monomeric units and vinyl chloride monomeric units. In certain embodiments of the present invention, the copolymer comprises from about 5 to about 50 percent by weight chlorotrifluoroethylene monomeric units and from about 50 to about 95 percent by weight vinyl chloride monomeric units. The copolymer and terpolyner preferably have weight average molecular weights from about 10,000 to about 500,000. The copolymers and terpolymers preferably have a glass transition temperature from about 70 to about 87° C. The copolymers and terpolymers preferably have a surface energy of between about 30 and about 40 mJ/m$^2$.

The present invention provides the processes of preparing membranes of chlorotrifluoroethylene and vinyl chloride copolymers and membranes of CTFE/VC/MA terpolymers and membranes of CTFE/VC/Third monomer terpolymers. In certain embodiments of the present invention, the CTFE/VC and CFTE/VC/MA and CTFE/VC/Third monomer polymeric membranes are made by Non-solvent Induced Phase Separation (NIPS) and Thermally Induced Phase Separation (TIPS) processes. In the case of porous membrane preparation, a pore former or pore formers are preferably used to control the density and size of the pores formed.

The present invention provides the membranes prepared from the CTFE/VC copolymers and membranes prepared from the CTFE/VC/MA and membranes of CTFE/VC/Third monomer terpolymers. In certain embodiments of the present invention, the CTFE/VC and CTFE/VC/MA and CTFE/VC/Third monomer polymeric membranes are nonporous. In other embodiments of the present invention, the CTFE/VC and CTFE/VC/MA and CTFE/VC/Third monomer polymeric membranes are porous. The CTFE/VC and CTFE/VC/MA and CTFE/VC/Third monomer polymeric membranes can be asymmetric integrally skinned membranes or thin film composite membranes. The CTFE/VC and CTFE/VC/MA and CTFE/VC/Third monomer polymeric membranes can have a flat sheet configuration or a hollow fiber configuration.

In certain embodiments of the present invention, the CTFE/VC polymeric membranes and CTFE/VC/MA polymeric membranes and CTFE/VC/Third monomer polymeric membranes are used as reverse osmosis membranes, filtration membranes, distillation membranes, pervaporation membranes, and selective gas separation membranes. In other embodiments of the present invention, the CTFE/VC and CTFE/VC/MA and CTFE/VC/Third monomer polymeric membranes are used in batteries, such as lithium ion batteries, and fuel cells.

The present invention also provides coatings prepared from CTFE/VC copolymers and CTFE/VC/MA and CTFE/VC/Third monomer terpolymers. In certain embodiments of the present invention, the CTFE/VC and CTFE/VC/MA and CTFE/VC/Third monomer polymeric coatings have surface energy from about 30 to about 40 mJ/m$^2$. The CTFE/VC and CTFE/VC/MA and CTFE/VC/Third monomer polymeric coatings are coil coatings, anti-reflective coatings, bio-resistant coatings, fire retardant coatings, coatings for plastic optical fibers, and protective coatings. The CTFE/VC and CTFE/VC/MA and CTFE/VC/Third monomer polymeric coatings on articles are formed for example by dip coating, spray coating, or coil coating.

The present invention also provides barrier materials of CTFE/VC copolymers and CTFE/VC/MA terpolymers for moisture and oxygen resistance. The present invention provides films made from the CTFE/VC copolymers and CTFE/VC/MA and CTFE/VC/Third monomer terpolymers. In certain embodiments of the present invention, the CTFE/VC and CTFE/VC/MA and CTFE/VC/Third monomer polymeric films have a surface energy from about 30 to about 40 mJ/m². The CTFE/VC and CTFE/VC/MA and CTFE/VC/Third monomer polymeric films are formed for example by solution casting or extrusion. The CTFE/VC and CTFE/VC/MA and CTFE/VC/Third monomer polymeric films can be used in packaging for moisture and oxygen resistance.

The present invention provides fibers made from CTFE/VC copolymers and CTFE/VC/MA and CTFE/VC/Third monomer terpolymers. In certain embodiments of the present invention, the VC/CTFE and CTFE/VC/MA polymeric fibers are formed by extrusion.

In certain embodiments of the present invention, the CTFE/VC copolymers and CTFE/VC/MA and CTFE/VC/Third monomer terpolymers are used as binders. In other embodiments of the present invention, the CTFE/VC copolymers and CTFE/VC/MA and CTFE/VC/Third monomer terpolymers are used as electrode binders for batteries, such as lithium ion batteries.

The CTFE/VC/MA and CTFE/VC/Third monomer terpolymers have improved properties, and particularly solubility, hydrophilicity, adhesion, and crosslinking, for use in membranes, coatings, extruded articles, and other applications. The membranes made from the CTFE/VC/MA and CTFE/VC/Third monomer terpolymers according to the invention are used in separation applications including reverse osmosis desalination, nanofiltration, ultrafiltration, microfiltration, membrane distillation, pervaporation, and selective gas separation.

The present invention provides a copolymer of chlorotrifluoroethylene (CTFE) and vinyl chloride (VC) and terpolymers of CTFE, VC and MA and terpolymers of CTFE, VC and third monomers as described herein that have improved properties, and particularly a high glass transition temperature, for use in membranes, films and coating. The membranes according to the invention are used in separation applications including reverse osmosis desalination, nanofiltration, ultrafiltration, microfiltration, membrane distillation, pervaporation, and selective gas separation. The membranes according to the invention are also used in batteries, such as lithium ion batteries, and fuel cells. The coatings may be coil coatings, anti-reflective coatings, bio-resistant coatings, fire retardant coatings, coatings for plastic optical fibers, and protective coatings. In other embodiments, the copolymer is used in barrier films to provide moisture and oxygen resistance.

Copolymer and Terpolymer Compositions

The present invention provides copolymers and terpolymers comprising chlorotrifluoroethylene monomeric units and vinyl chloride monomeric units. The copolymers and terpolymers preferably comprise from about 5 to about 50 percent by weight CTFE monomeric units and from about 50 to about 95 percent by weight VC monomeric units.

The vinyl chloride monomeric units may be present in the preferred copolymers and the preferred terpolymers in an amount of at least about 50% by weight, at least about 60% by weight, at least about 65% by weight, at least about 70% by weight, at least about 75% by weight, or at least about 80% by weight, and up to about 85% by weight, or up to about 90% by weight, or up to about 95% by weight of the monomers in the copolymer or terpolymer.

The CTFE monomeric units may be present in an amount of at least about 5% by weight, or at least about 10% by weight, at least about 15% by weight of the monomers in the copolymer, and up to about 50% by weight, up to about 40% by weight, or up to about 35% by weight, or up to about 30% by weight of the monomers in the copolymer or terpolymer.

The vinyl chloride monomers may comprise from about 50 to about 95 wt. % of the monomers of the copolymer or terpolymer, or from about 60 to about 95 wt. % of the monomers of the copolymer or terpolymer, or from about 60 to about 90 wt. % of the monomers of the copolymer or terpolymer, or from about 65 to about 95 wt. % of the monomers of the copolymer or terpolymer, or from about 65 to about 90 wt. % of the monomers of the copolymer or terpolymer, or from about 70 to about 95 wt. % of the monomers of the copolymer or terpolymer, or from about 70 to about 90 wt. % of the monomers of the copolymer or terpolymer, or from about 75 to about 95 wt. % of the monomers of the copolymer or terpolymer, or about 75 to about 90 wt. % of the monomers of the copolymer or terpolymer, or from about 80 to about 90 wt. % of the monomers of the copolymer or terpolymer, or about 80 to about 95 wt. % of the monomers of the copolymer or terpolymer.

Correspondingly, the CTFE monomer may comprise from about 5 to about 50 wt. % of the monomers of the copolymer or terpolymer, or from about 5 to about 40 wt. % of the monomers of the copolymer or terpolymer, or from about 10 to about 40 wt. % of the monomers of the copolymer or terpolymer, or from about 5 to about 35 wt. % of the monomers of the copolymer or terpolymer, or from about 10 to about 35 wt. % of the monomers of the copolymer or terpolymer, or from about 5 to about 30 wt. % of the monomers of the copolymer or terpolymer, or from about 10 to about 30 wt. % of the monomers of the copolymer or terpolymer, or from about 5 to about 25 wt. % of the monomers of the copolymer or terpolymer r, or about 10 to about 25 wt. % of the monomers of the copolymer or terpolymer, or from about 10 to about 20 wt. % of the monomers of the copolymer or terpolymer, or about 5 to about 20 wt. % of the monomers of the copolymer or terpolymer.

In another embodiment, the vinyl chloride monomers may comprise from about 50 to about 75 wt. % of the monomers of the copolymer or terpolymer, or from about 55 to about 75 wt. % of the monomers of the copolymer or terpolymer, or from about 60 to about 75 wt. % of the monomers of the copolymer or terpolymer, or from about 65 to about 75 wt. % of the monomers of the copolymer or terpolymer, or from about 50 to about 70 wt. % of the monomers of the copolymer or terpolymer, or from about 55 to about 70 wt. % of the monomers of the copolymer or terpolymer, or from about 55 to about 65 wt. % of the monomers of the copolymer or terpolymer. Correspondingly, the CTFE monomer may comprise from about 25 to about 50 wt. % of the monomers of the copolymer or terpolymer, or from about 25 to about 45 wt. % of the monomers of the copolymer or terpolymer, or from about 25 to about 40 wt. % of the monomers of the copolymer or terpolymer, or from about 25 to about 35 wt. % of the monomers of the copolymer or terpolymer, or from about 30 to about 50 wt. % of the monomers of the copolymer or terpolymer, or from about 30 to about 45 wt. % of the monomers of the copolymer or terpolymer, or from about 35 to about 45 wt. % of the monomers of the copolymer or terpolymer.

The copolymer or terpolymers used in the present invention may comprise the above weight percentages of the vinyl chloride and CTFE monomers. The copolymer or terpolymers used in the present invention can consist essentially of the above weight percentages of the vinyl chloride and CTFE monomers. The fluorocopolymers used in the present invention can consist of the above weight percentages of the vinyl chloride and CTFE monomers.

The ratio of chlorotrifluoroethylene monomeric units versus vinyl chloride monomeric units in the copolymer or terpolymers of the present invention is from about 50:50% by weight to about 5:95% by weight.

Methods of Copolymer or Terpolymer Preparation

The copolymer or terpolymer according to the present invention are formed by copolymerization or terpolymerization of the monomers comprising CTFE and VC. The present invention provides a process of synthesizing copolymer or terpolymers comprising chlorotrifluoroethylene monomeric units and vinyl chloride monomeric units. The amount of monomers charged in the process is from about 5 to about 50 percent by weight CTFE and correspondingly from about 50 to about 95 percent by weight VC. In preferred embodiments, the chlorotrifluoroethylene monomers and vinyl chloride monomers are charged at one time. The chlorotrifluoroethylene monomers and vinyl chloride monomers are polymerized in aqueous solution using a water-soluble initiator or a water-soluble redox initiator system to obtain CTFE/VC copolymer or CTFE/VC/MA or CTFE/VC/Third monomer terpolymers with high glass transition temperatures. The aqueous solution is preferably free of suspension agents or emulsifiers.

The copolymerization or terpolymerization of chlorotrifluoroethylene and vinyl chloride monomers (and MA or third monomers when present) may be conducted in aqueous solutions, particularly aqueous solutions that can be used in conjunction with a free radical polymerization reaction. The water-soluble radical initiators may include any compounds that initiate the copolymerization of chlorotrifluoroethylene and vinyl chloride monomers. Non-limiting examples of such initiators include $Na_2S_2O_8$, $K_2S_2O_8$, $(NH_4)_2S_2O_8$, $Fe_2(S_2O_8)_3$, $(NH_4)_2S_2O_8/Na_2S_2O_5$, $(NH_4)_2S_2O_8/FeSO_4$, $(NH_4)_2 S_2O_8/Na_2S_2O_5/FeSO_4$, t-butyl hydroperoxide, and the like, as well as combinations thereof.

The polymerization is typically carried out at a temperature, pressure and length of time sufficient to produce the desired chlorotrifluoroethylene/vinyl chloride copolymers or CTFE/VC/MO or CTFE/VC/Third monomer terpolymers and may be performed in any reactor known for such purposes, such as, but not limited to, an autoclave reactor.

In one embodiment of the present invention, the polymerization is carried out at a temperature from about 10° C. to about 80° C. and at a pressure from about 10 psi to about 300 psi. The length of the polymerization may be any length of time to achieve the desired level of polymerization. In certain non-limiting embodiments, it may be between about 10 hours and about 100 hours. One of skill in the art will appreciate that such conditions may be modified or varied based upon the desired conversion rate and the molecular weight of the resulting chlorotrifluoroethylene/vinyl chloride copolymers or CTFE/VC/MO or CTFE/VC/Third monomer terpolymers.

The amounts of initiator may be provided to control the conversion rate of the copolymer or terpolymer produced and/or the molecular weight of the copolymer produced. Generally, though not exclusively, the radical initiator is provided at a concentration of less than 2.0 weight percent based on the weight of all the monomers in the copolymerization or terpolymerization reaction.

The initiator may be added into the copolymerization or terpolymerization system multiple times or in a continuous mode to obtain the desired copolymerization/terpolymerization yield and molecular weight of the copolymer or terpolymer produced. Generally, though not exclusively, the initiator is added 1 to 3 times into the polymerization system.

In a preferred embodiment of the present invention, the copolymerization of chlorotrifluoroethylene and vinyl chloride monomers or terpolymerization of chlorotrifluoroethylene and vinyl chloride monomers with MA or a third monomer is carried out in an aqueous solution consisting of degassed deionized water, redox initiators including $(NH_4)_2S_2O_8$ and $Na_2S_2O_5$, and catalyst $FeSO_4$.

Copolymer and Terpolymer Properties

The monomeric unit ratio of the copolymer or terpolymer is established from the elemental analysis of the copolymer.

The present invention provides copolymers and terpolymers as described herein wherein the copolymer or the terpolymer has a weight average molecular weight from about 10,000 to about 500,000 Daltons. The copolymer or the terpolymer may have a weight average molecular weight greater than about 20,000 Daltons, or greater than about 30,000 Daltons, or greater than about 50,000 Daltons, or greater than about 100,000 Daltons. The copolymers or the terpolymers as described herein can have weight average molecular weights of less than 500,000 Daltons, less than about 300,000 Daltons, or less than 250,000 Daltons, or less than 200,000 Daltons.

The weight average molecular weight as used herein are measured by gel permeation chromatography using an Agilent Technologies PL-GPC-20 High Temperature Chromatograph, equipped with two columns, a 300×7.5 mm PL-GEL 5 µ Mixed B support and the second, a 300×7.5 mm PL-GEL 5 µ Mixed C support. The eluent for this system is THF. The system is equilibrated a 40C. Standardization is provided by using polystyrene, PS-M Polystyrene Standard. The method is described in MODERN SIZE-EXCLUSION LIQUID CHROMATOGRAPHY Practice of Gel Permeation and Gel Filtration Chromatography SECOND EDITION Andre M. Striegel, Wallace W. Yau, Joseph J. Kirkland and Donald D. Bly, 2009 by John Wiley & Sons, Inc.

The copolymers and terpolymers of the present invention have a glass transition temperature from about 70° C. to about 87° C., or from about 75° C. to about 85° C. The glass transition temperature is determined by a DSC Q200 instrument (TA) at a 10° C./min temperature increase (see B. Wunderlich, Thermal Analysis, Academic Press, 1990, pp. 417-431).

The copolymers and terpolymers of the present invention have a surface energy of between about 30 and about 40 $mJ/m^2$. The surface energy of the copolymers is determined by water and diiodomethane contact angle measurements on the smooth surfaces of the copolymers coated on glass slides, which method is well known in the art.

Copolymer Processing

Chlorotrifluoroethylene/vinyl chloride copolymers and the CTFE/VC/Ma and CTFE/VC/Third monomer terpolymers of the present invention can also be dissolved in certain organic solvents at elevated temperatures. Such hot solutions can be used as casting dope or spinning dope for membrane fabrication. Examples of such solvents include, but are not limited to, N,N-dimethyl formamide, N,N-dimethyl acetamide, N-methyl pyrrolidone, and the like.

The membrane, film, or coating composition may optionally include one or more additives. Non-limiting examples of such additives are organic compounds, polymers, inorganic compounds, metals, metal oxides, and the like, or combinations thereof. Additional or specific additives are provided herein or will be apparent to the skilled artisan based on the disclosure herein.

Chlorotrifluoroethylene/vinyl chloride and CTFE/VC/Ma and CTFE/VC/Third monomer polymeric membranes of the present invention can be fabricated in both flat sheet and hollow fiber configurations. Flat sheet membranes and hollow fiber membranes can be asymmetric integrally skinned membranes manufactured from a casting dope or a spinning dope by a phase separation process. Asymmetric integrally skinned flat sheet membranes and hollow fiber membranes have a thin, dense, nonporous or porous selective skin layer that performs the separation, supported on a highly porous substrate layer made from the same material.

Flat sheet membranes and hollow fiber membranes can also be thin film composite (TFC) membranes made by lamination or dip coating techniques. TFC membranes comprise a thin, dense, nonporous or porous selective layer that performs the separation and a highly porous substrate layer made separately from a different material.

Hollow fiber membranes preferably have high membrane area and are self-supporting membranes.

The chlorotrifluoroethylene/vinyl chloride copolymer and CTFE/VC/Ma and CTFE/VC/Third monomer polymeric membranes can be made by Non-solvent Induced Phase Separation (NIPS) process. In the case of porous membrane preparation, a pore former or pore formers are used to control the density and size of the pores formed in the porous CTFE/VC or CTFE/VC/MA or CTFE/VC/Third monomer polymeric membranes. The non-limiting examples of pore formers are glycerin, polyethylene glycol (PEG), and polyvinyl pyrrolidone (PVP).

The membranes disclosed herein may have a uniform pore structure. Such membranes may be formed according to the Loeb-Sourirajan process.

Membranes may be formed by phase inversion. Polymer membranes, for example for water treatment, can be formed by phase inversion and the resulting membranes are categorized according to their pore sizes. Reverse osmosis membranes used for water desalination typically contain pores of about 5-20 Å in diameter. Colloids and macromolecules are separated from water using ultrafiltration membranes typically having pore sizes from about 10 to about 1,000 Å. Reverse osmosis and ultrafiltration membranes are prepared by phase inversion processes (see, for example, Loeb, et al., Advan. Chem. Scr., 38, 117, 1962; Kesting, et al., Synthetic Polymeric Membranes, New York: McGraw-Hill Book Company, 1971, pages 116-157; Strathmaim, et al., "A Rationale for the Preparation of Loeb-Sourirajan-Type Cellulose Acetate Membranes," J. Appl. Poly. Chem., 15, 811-28, 1971; Strathmann, et al., "The Formation Mechanism of Phase Inversion Membranes", Desalination, 21, 241-55, 1977; Strathmann, et al., "The Formation Mechanism of Asymmetric Membranes," Desalinalion, 16, 179-203, 1975). Membranes produced using this process typically have an asymmetric porous structure consisting of a dense, 0.1 to 1 micron surface layer overlaying a highly porous, 100 to 200 micron sublayer (Strathmann, in Synthetic Membranes: Science Engineering and Applications, Bungay, P. M., et al., eds. Dordrecht, The Netherlands: Kluwer Academic Publishers, 1983, page 1). The separation characteristics of the membrane are determined by the pore size distribution in the surface, or "active" layer. The porous sublayer provides mechanical support.

Apparatus for the continuous fabrication of polymer membranes by phase inversion are known. The steps, in general, involve dissolving a polymer in a solvent to form a solution containing from about 10 to about 30 weight percent polymer. Small quantities of nonsolvent and organic or inorganic salts are sometimes added to the solution. The solution may be cast under a doctor blade onto a moving, nonwoven polyester or Mylar belt, which may serve as a permanent support for the finished membrane. The thickness of doctor blade gap and the viscosity of the polymer blend solution control the thickness of the formed membrane. The thickness of the formed membrane is dependent on the end-use of the material, and can vary from about 1 μm to 2 mm. Preferably, the formed membrane has a thickness of 10 μm to 500 μm, and most preferably from 20 μm to 250 μm. The membrane then is immersed in a non-solvent (usually water), i.e., a fluid in which the polymer in substantially insoluble. This results in gelation of the polymer to form an asymmetric, porous structure. The membrane can be heat treated in a second water bath to promote pore shrinkage.

The chlorotrifluoroethylene and vinyl chloride polymeric membranes and the CTFE/VC/MA and CTFE/MA/Third monomer terpolymeric membranes of the present invention find utility and/or exhibit advantages in separation applications in which conventionally used polymeric membranes have been applied. In certain highly preferred embodiments, the membranes comprising chlorotrifluoroethylene and vinyl chloride copolymers and the CTFE/VC/MA and CTFE/MA/Third monomer terpolymeric membranes of the present invention can be used in reverse osmosis desalination, nanofiltration, ultrafiltration, microfiltration, membrane distillation, pervaporation, and selective gas separation.

(1) Reverse Osmosis (RO)

CTFE/VC polymeric membrane materials and the CTFE/VC/MA and CTFE/MA/Third monomer terpolymeric membrane materials have surface energy between about 30 and about 40 mJ/m$^2$, which is suitable for water treatment and purification. In addition, CTFE/VC polymeric materials and the CTFE/VC/MA and CTFE/MA/Third monomer terpolymeric membrane materials are stable within a wide range of pH, which is desirable for RO separations. In addition, CTFE/VC polymeric materials and the CTFE/VC/MA and CTFE/MA/Third monomer terpolymeric membrane materials are also resistant to microbiological attack and chlorine oxidation.

Optionally, CTFE/VC polymeric membrane materials and the CTFE/VC/MA and CTFE/MA/Third monomer terpolymeric membrane materials may be provided with increased hydrophilicity to increase water uptake and RO permeation flux.

(2) Microfiltration (MF), Ultrafiltration (UF), and Nanofiltration (NF)

Over the last fifteen years, PVDF has commonplace for use in microfiltration (MF) and ultrafiltration (UF). However, as compared to PVDF, CTFE/VC polymeric membrane materials and the CTFE/VC/MA and CTFE/MA/Third monomer terpolymeric membrane materials of the present invention have a more desirable surface energy for water filtration and more resistant to caustic and oxidative attack. Fabrication parameters may be varied to result in CTFE/VC polymeric membranes and the CTFE/VC/MA and CTFE/MA/Third monomer terpolymeric membrane materials having different structures, suitable for microfiltration, ultrafiltration, and nanofiltration.

(3) Membrane Distillation (MD)

Membrane distillation (MD) requires high hydrophobicity of membrane materials. Commercially available PTFE is usually a choice; however, the solubility of PTFE is an issue in membrane fabrications. CTFE/VC polymeric materials and the CTFE/VC/MA and CTFE/MA/Third monomer terpolymeric membrane materials of the present invention have adjustable surface energy depending on the monomer ratios. In addition, CTFE/VC polymeric materials and the CTFE/VC/MA and CTFE/MA/Third monomer terpolymeric membrane materials are soluble in certain organic solvents, which presents an advantage over PTFE for membrane fabrication.

(4) Pervaporation (PV)

Pervaporation is a membrane process where permeating substances change their phase. For example, polydimethylsiloxane and polyoctylmethylsiloxane are rubbery membrane materials and permeable for organics (i.e., organophilic). Pervaporation by polydimethylsiloxane or polyoctylmethylsiloxane membranes are used for the separation of organics from water, such as in the recovery of flavors in food industries and in wastewater treatment. In contrast, CTFE/VC copolymers and the CTFE/VC/MA and CTFE/MA/Third monomer terpolymers are glassy polymeric materials with $T_g$ values as described herein (e.g., about 80° C.), which is expected to open up new areas for organic separations.

(5) Selective Gas Separation

One important application of fluoropolymers is in the area of selective gas separations. Commercial examples in this field include TEFLON AF 2400 and AF 1600, HYFLON AD 80 and AD 60, and CYTOP. See Ind. Eng. Chem. Res. 2009, 48, 4638-4663. In $CO_2/CH_4$ separations, these fluoropolymers demonstrate high $CO_2$ permeability, but relatively low $CO_2/CH_4$ selectivity. Nonporous asymmetric integrally skinned membranes and nonporous thin film composite (TFC) membranes made of CTFE/VC copolymers and the CTFE/VC/MA and CTFE/MA/Third polymeric membranes terpolymers of the present invention further improve the performance in selective gas separations.

The chlorotrifluoroethylene and vinyl chloride polymeric membranes and the CTFE/VC/MA and CTFE/MA/Third monomer polymeric membranes of the present invention also find utility and/or exhibit advantages in electric power supply devices and electric power stations in which conventionally used polymeric membranes have been applied. In certain highly preferred embodiments, the membranes comprising chlorotrifluoroethylene and vinyl chloride copolymers and the CTFE/VC/MA and CTFE/MA/Third monomer of the present invention can be used in batteries, such as lithium ion batteries, and fuel cells.

The chlorotrifluoroethylene and vinyl chloride copolymers and the CTFE/VC/MA and CTFE/MA/Third monomer of this invention can be applied to a support or article of manufacture in any of the many ways generally known in the art to form coatings. The CTFE/VC and the CTFE/VC/MA and CTFE/MA/Third monomer polymeric coatings have surface energy from about 30 to about 40 mJ/m². The CTFE/VC and the CTFE/VC/MA and CTFE/MA/Third monomer polymeric coatings can be used as corrosion resistant coatings, anti-reflective coatings, bio-resistant coatings, fire retardant coatings, coatings for plastic optical fibers, and protective coatings. The CTFE/VC and the CTFE/VC/MA and CTFE/MA/Third monomer polymeric coatings on articles can be formed by dip coating, spray coating, or coil coating. In a non-limiting example, the copolymer is dissolved as described in the Examples below and the copolymer solution applied to a support or article of manufacture and then dried.

The chlorotrifluoroethylene and vinyl chloride copolymers of this invention can be used as barrier materials for moisture and oxygen resistance. The CTFE/VC and the CTFE/VC/MA and CTFE/MA/Third monomer polymeric materials of this invention are useful in food and drug packaging.

The chlorotrifluoroethylene and vinyl chloride copolymers of this invention can be made into films. The CTFE/VC and the CTFE/VC/MA and CTFE/MA/Third monomer polymeric films have surface energy from about 30 to about 40 mJ/m². The CTFE/VC and the CTFE/VC/MA and CTFE/MA/Third monomer polymeric films can be made by solution casting or extrusion.

The chlorotrifluoroethylene and vinyl chloride copolymers and the CTFE/VC/MA and CTFE/MA/Third monomer terpolymers of this invention can be made into fibers. The CTFE/VC and the CTFE/VC/MA and CTFE/MA/Third monomer polymeric fibers can be formed by extrusion.

The membranes and films comprising the copolymers and terpolymers as described herein may have a high surface energy and resist fouling. An increase in hydrophilicity offers better fouling resistance because protein and many other foulants are hydrophobic in nature. The resistance to fouling may be evaluated by measuring the change in the flow rate, or flux, through a membrane over time as the membrane is exposed to agents that mimic the fouling of the membrane during use. The test fouling agents are solutions of alginic acid, bovine serum albumin, and humic acid. A solution of test fouling agent is run through the membrane in a cross-flow apparatus. Flux reaches zero at fouling. The method for the fouling assay is described in *Influence of cross-flow velocity on membrane performance during filtration of biological suspension* by Hyeok Choi et al., Journal of Membrane Science, Volume 248, Issues 1-2, 15 Feb. 2005, Pages 189-199. The membranes of the invention show longer times to fouling as compared to conventional membranes when tested according to this method.

The membranes comprising the copolymers and terpolymers as described herein have excellent chemical stability. Chemical stability is particularly important to allow the membrane to withstand the conditions typically used for the cleaning of the membranes. Accordingly, the membranes have a high alkaline resistance and are stable when treated with solutions having a pH of 9 or higher, and preferably having a pH as high as pH 13. Preferably, the copolymer membrane shows a weight change of about 1% or less, when exposed to a 5% NaOH solution at 50° C. for 30 days.

The copolymer and terpolymer membranes also preferably have a high tolerance to oxidants (for example, bleach) that are commonly used in cleaning. Preferably, the copolymer and terpolymer membranes shows a weight loss of about 1.5% or less, when exposed to a 5% NaClO solution (bleach solution) at 50° C. for 30 days.

The copolymer and terpolymer membranes also preferably have a high tolerance to acids that are commonly used in cleaning. Preferably, the copolymer and terpolymer membranes shows a weight change of about 0.5% or less, when exposed to a 5% citric acid at 50° C. for 30 days.

Additionally, the membranes have a high tolerance for the cleaning temperatures of greater than about 40° C., and preferably as high as about 50° C., or more.

The copolymer and terpolymer membranes and films preferably shows a high flexibility to help prevent breakage. The elasticity modulus is a measurement of the ability to be elastically (i.e., non-permanently) deformed in response to an applied force. The elasticity modulus is the slope of its stress-strain curve in the elastic deformation region. The modulus of elasticity of the copolymer and terpolymer membranes and films as described herein is preferably in the range from about 600 to 2400 MPa; and more preferably from about 1500 to 2400 MPa as measured according to ASTM D638.

The films comprising the copolymers and terpolymers described herein may have low oxygen permeability as measured by ASTM D3985 using a MOCON ox-Tran 2/20. Accordingly, the films has an oxygen permeability of less than about 0.01 g/(m²·day), and preferably less than about 0.005 g/(m²·day).

The films comprising the copolymers as described herein have low moisture permeability as measured by ASTM F1249 using a MOCON Perma-Tran 3/31. Accordingly, the films has a moisture permeability of less than about 0.01 g/(m²·day), and preferably less than about 0.005 g/(m²·day).

The chlorotrifluoroethylene and vinyl chloride copolymers and the CTFE/VC/MA and CTFE/MA/Third monomer terpolymers of this invention can be used as binders. Accordingly, the CTFE/VC polymers and the CTFE/VC/MA and CTFE/MA/Third monomer terpolymers are used as electrode binders for lithium ion batteries. After 50 cycles of discharging and recharging, the capacity retention of lithium ion batteries is above 85%. The coulomb efficiency of lithium ion batteries is above 99%.

The present invention also provides terpolymers of chlorotrifluoroethylene (CTFE), vinyl chloride (VC), and a third monomer. The third monomers can be methyl vinyl ether, ethyl vinyl ether, n-butyl vinyl ether, iso-butyl vinyl ether, cyclohexyl vinyl ether, hydroxy butyl vinyl ether, 1,4-cyclohexanedimethanol mono vinyl ether, 3-amino propyl vinyl ether, 1,4-butanediol divinyl ether, diethyleneglycol divinyl ether, 1,4-cyclohexanedimethanol divinyl ether, vinyl acetate, vinyl propionate, vinyl benzoate, vinyl chloroformate, vinyl cinnamate, vinyl alcohols, N-vinyl pyrrolidone, N-vinyl caprolactam, N-vinyl-imidazole, N-vinyl-N-methylacetamide, acrylic acid, methacrylic acid, methyl acrylate, methyl methacrylate, ethyl acrylate, ethyl methacrylate, benzyl acrylate, benzyl methacrylate, acrylamide, maleic acid, N-methyl maleimide, N-ethyl maleimide, methyl maleate, ethyl maleate, allyl amine, etc. The terpolymers preferably comprise from about 5 to about 95 percent by weight CTFE monomeric units, from about 95 to about 5 percent by weight VC monomeric units, and from about 0.5 to about 30 percent by weight of the third monomer units. The terpolymers have improved properties, and particularly solubility, hydrophilicity, adhesion, and crosslinking, for use in membranes, coatings, extruded articles, and other applications. It should be appreciated by those persons having ordinary skill in the art to which the present invention relates that any of the features described herein in respect of any particular aspect and/or embodiment of the present invention can be combined with one or more of any of the other features of any other aspects and/or embodiments of the present invention described herein, with modifications as appropriate to ensure compatibility of the combinations. Such combinations are considered to be part of the present invention contemplated by this disclosure.

The following examples further illustrate the invention, but should not be construed to limit the full scope of the invention.

EXAMPLES

Example 1

Synthesis of CTFE/VC 10/90 Copolymer

Into 400 mL of degassed deionized water with stirring, 0.0224 g of $FeSO_4 \cdot 7H_2O$ was added. 0.7505 g of $(NH_4)_2S_2O_8$ dissolved in 10 mL of degassed deionized water was added into the above aqueous solution. The obtained aqueous solution was immediately transferred into an evacuated 600 mL autoclave reactor through a syringe. The autoclave reactor was then cooled with liquid nitrogen. A mixture containing 90.0 g of vinyl chloride and 10.4 g of chlorotrifluoroethylene was charged into the autoclave reactor. Total 99.1 g of monomers were charged. The autoclave reactor was slowly warmed up. Stir was started when possible. When the internal temperature increased to about 8° C., 0.7840 g of $Na_2S_2O_5$ dissolved in 10 mL degassed deionized water was pumped into the autoclave reactor, followed by 5 mL degassed deionized water to rinse the pumping system. The autoclave reactor was slowly heated up. Meanwhile the stir rate was increased to 1000 rpm. When the internal temperature increased to about 20° C., an exothermic reaction started. The internal temperature was controlled between 35° C. and 45° C. by dry ice cooling and slow heating.

After 22 hours, the reaction was stopped. The autoclave reactor was cooled down. At room temperature, the residual pressure was slowly released. The white thick milk-like polymerization mixture (pH about 2.5) was filtered through a nylon cloth. The obtained solid polymer was thoroughly washed with water and dried under vacuum (29 in. Hg) at 45° C. to dryness. The dried polymer weighed 90.9 g to give a polymerization yield of 91.7%.

The actual monomer unit ratio in the copolymer determined by elemental analysis was 8.54 wt % (4.77 mol %) of chlorotrifluoroethylene and 91.46 wt % (95.23 mol %) of vinyl chloride. The weight average molecular weight of the copolymer measured by GPC in DMAc was 169,322 (polydispersity 4.13). The glass transition temperature $T_g$ of the copolymer determined by DSC was 84.4° C. The coating of the copolymer (by DMAc solution casting on glass slides followed by drying) gave a water contact angle of 82.8°, a diiodomethane contact angle of 50.9°, and the corresponding surface energy of 37.5 mJ/m².

Example 2

Synthesis of CTFE/VC 30/70 Copolymer

Into 400 mL of degassed deionized water with stirring, 0.0221 g of $FeSO_4 \cdot 7H_2O$ was added. 0.7493 g of $(NH_4)_2S_2O_8$ dissolved in 10 mL of degassed deionized water was added into the above aqueous solution. The obtained aqueous solution was immediately transferred into an evacuated 600 mL autoclave reactor through a syringe. The autoclave reactor was then cooled with liquid nitrogen. A mixture containing 72.6 g of vinyl chloride and 30.3 g of chlorotrifluoroethylene was charged into the autoclave reactor. Total 100.6 g of monomers were charged. The autoclave reactor was slowly warmed up. Stir was started when possible. When the internal temperature increased to about 10° C., 0.7835 g of $Na_2S_2O_5$ dissolved in 10 mL degassed deionized water was pumped into the autoclave reactor, followed by 5 mL degassed deionized water to rinse the pumping system. The autoclave reactor was slowly heated up. Meanwhile the stir rate was increased to 1000 rpm. When the internal temperature increased to about 20° C., an exothermic reaction started. The internal temperature was controlled between 35° C. and 40° C. by dry ice cooling and slow heating.

After 68 hours, the reaction was stopped. The autoclave reactor was cooled down. At room temperature, the residual pressure was slowly released. The white thick milk-like polymerization mixture with a pH about 2.5 was filtered through a nylon cloth. The obtained solid polymer was thoroughly washed with water and dried under vacuum (29 in. Hg) at 45° C. to dryness. The dried polymer weighed 86.4 g to give a polymerization yield of 85.9%.

The actual monomer unit ratio in the copolymer determined by elemental analysis was 25.75 wt % (15.69 mol %) of chlorotrifluoroethylene and 74.25 wt % (84.31 mol %) of vinyl chloride. The weight average molecular weight of the copolymer measured by GPC in DMAc was 215,378 (polydispersity 3.77). The glass transition temperature $T_g$ of the copolymer determined by DSC was 81.02° C. The coating of the copolymer (by DMAc solution casting on glass slides followed by drying) gave a water contact angle of 84.7°, a diiodomethane contact angle of 56.3°, and the corresponding surface energy of 34.5 mJ/m$^2$.

Example 3

Synthesis of CTFE/VC 50/50 Copolymer

Into 400 mL of degassed deionized water with stirring, 0.0221 g of FeSO$_4$.7H$_2$O was added. 0.5267 g of (NH$_4$)$_2$S$_2$O$_8$ dissolved in 10 mL of degassed deionized water was added into the above aqueous solution. The obtained aqueous solution was immediately transferred into an evacuated 600 mL autoclave reactor through a syringe. The autoclave reactor was then cooled with liquid nitrogen. A mixture containing 50.6 g of vinyl chloride and 50.9 g of chlorotrifluoroethylene was charged into the autoclave reactor. Total 99.3 g of monomers were charged. The autoclave reactor was slowly warmed up. Stir was started when possible. When the internal temperature increased to about 6° C., 0.5460 g of Na$_2$S$_2$O$_5$ dissolved in 10 mL degassed deionized water was pumped into the autoclave reactor, followed by 5 mL degassed deionized water to rinse the pumping system. The autoclave reactor was slowly heated up. Meanwhile the stir rate was increased to 1000 rpm. When the internal temperature increased to about 27° C., a slightly exothermic reaction started. The internal temperature was controlled between 35° C. and 40° C. by air cooling and slow heating.

After 20 hours, the reaction was stopped. The autoclave reactor was cooled down. At room temperature, the residual pressure was slowly released. The white thick milk-like polymerization mixture with a pH about 2.5, combined with rinsing water, was filtered through a nylon cloth. The obtained solid polymer was thoroughly washed with water and dried under vacuum (29 in. Hg) at 40° C. to dryness. The dried polymer weighed 88.5 g to give a polymerization yield of 89.1%.

The actual monomer unit ratio in the copolymer determined by elemental analysis was 49.38 wt % (34.36 mol %) of chlorotrifluoroethylene and 50.62 wt % (65.64 mol %) of vinyl chloride. The weight average molecular weight of the copolymer measured by GPC in DMAc was 142,460 (polydispersity 3.40). The DSC measurement of the copolymer gave a glass transition temperature $T_g$ 77.09° C., melting point 202.4° C., and crystallinity 4.33%. The coating of the copolymer (by DMAc solution casting on glass slides followed by drying) gave a water contact angle of 85.5°, a diiodomethane contact angle of 56.3°, and the corresponding surface energy of 34.2 mJ/m$^2$.

Example 4

Synthesis of CTFE/VC/MA (Maleic Acid) Terpolymer

Into 200 mL of degassed deionized water with stirring, 0.8300 g of (NH$_4$)$_2$S$_2$O$_8$ dissolved in 10 mL of degassed deionized water was added. The obtained aqueous solution was immediately transferred into an evacuated 600 mL autoclave reactor through a syringe. The autoclave reactor was then cooled with liquid nitrogen. A mixture containing 120.0 g of vinyl chloride and 51.4 g of chlorotrifluoroethylene was charged into the autoclave reactor. The autoclave reactor was slowly warmed up. Stir was started when possible. When the internal temperature increased to about 5° C., 0.9900 g of Na$_2$S$_2$O$_5$ dissolved in 10 mL degassed deionized water was pumped into the autoclave reactor. Then 0.0700 g of FeSO$_4$.7H$_2$O dissolved in 5 mL degassed deionized water was pumped into the autoclave reactor, followed by 5 mL degassed deionized water to rinse the pumping system. The autoclave reactor was slowly warmed up. Meanwhile the stir rate was increased to 500 rpm. When the internal temperature increased to about 17° C., an exothermic reaction started. Then 6.7600 g of maleic anhydride dissolved in 40 mL degassed deionized water was pumped into the autoclave reactor, followed by 22 mL degassed deionized water to rinse the pumping system. The internal temperature was controlled between 35° C. and 47° C. by air cooling.

After 18 hours, the reaction was stopped. The autoclave reactor was cooled down. At room temperature, the residual pressure was slowly released. The white thick milk-like polymerization mixture with a pH about 1, combined with rinsing water, was filtered through a filter paper. The obtained solid polymer was thoroughly washed with water and dried under vacuum (29 in. Hg) at 35° C. to dryness. The dried polymer weighed 91.6 g to give a polymerization yield of 51.4%.

The elemental analysis showed the polymer containing 35.47% C, 3.34% H, 50.22% Cl, and 9.74% F. The IR measurement confirmed the terpolymer containing maleic acid monomeric units with both carbonyl group (C=O) at 1600-1750 cm$^{-1}$ and hydroxyl group (OH) at 3300 cm$^{-1}$ (broad). The weight average molecular weight of the terpolymer measured by GPC in THF was 152,409 (polydispersity 2.68). The DSC measurement of the terpolymer gave a glass transition temperature $T_g$ 80.8° C. The non-porous membrane of the terpolymer (by DMAc solution casting on polyester fabric support, followed by solvent exchange with water and then drying) gave a water contact angle of 76.8°, a diiodomethane contact angle of 40.4°, and the corresponding surface energy of 44.1 mJ/m$^2$.

Example 5

Preparation of Nonporous Asymmetric Integrally Skinned Flat Sheet Membrane

This example is presented to illustrate the preparation of CTFE/VC copolymer asymmetric integrally skinned flat sheet membrane which has a thin, dense, nonporous selective skin layer that performs the separation, supported on a highly porous substrate layer made from the same material.

20.43 g of CTFE/VC copolymer from Example 2 was dissolved in 82.80 g of DMAc to form a casting dope. The casting dope was cast on a nylon cloth to form a membrane having an initial thickness of 0.20 mm. After 15 seconds in air (28° C. and 46% humidity), the membrane was immersed into ice water for 30 minutes, and then transferred into water at room temperature for 2 hours. The water-wet membrane was dried in air overnight and then at 50° C. for 24 hours to obtain VC/CTFE copolymer nonporous asymmetric integrally skinned flat sheet membrane having a thickness of 0.09 mm.

Variation of the above preparation parameters results in CTFE/VC copolymer nonporous asymmetric integrally skinned flat sheet membranes with different structures, suitable for water desalination, membrane distillation, pervaporation, and selective gas separation.

Example 6

Preparation of CTFE/VC Copolymer Nonporous Thin Film Composite Flat Sheet Membrane This example is presented to illustrate the preparation of a nonporous thin film composite (TFC) flat sheet membrane using dip coating technique. The TFC flat sheet membrane has CTFE/VC copolymer as a nonporous selective layer and a highly porous substrate layer made separately from a different material, PVDF.

3.21 g of CTFE/VC copolymer from Example 2 was dissolved in 98.40 g of tetrahydrofuran (THF) to form a dip coating solution. The porous PVDF substrate layer (one side shielded) was immersed into the dip coating solution, and then taken out immediately. The CTFE/VC copolymer coated porous PVDF substrate layer was left in air overnight, and then dried under vacuum (29 in. Hg) at 50° C. for 24 hours to obtain the corresponding thin film composite flat sheet membrane.

Variation of the above preparation parameters results in CTFE/VC copolymer nonporous thin film composite flat sheet membranes with different structures, suitable for water desalination, membrane distillation, pervaporation, and selective gas separation.

Example 7

Preparation of CTFE/VC Copolymer Porous Flat Sheet Membrane

This example is presented to illustrate the preparation of CTFE/VC copolymer porous flat sheet membrane.

20.2 g of CTFE/VC copolymer from Example 2, 12.0 g of polyvinyl pyrrolidone (PVP K30), 6.0 g of functionalized polyether, and 2.0 g of PEG 400 were dissolved in 60.0 g of N,N-dimethylacetamide (DMAc) at 30° C. to form a casting dope. The casting dope was cast on a polyester fabric support to form a membrane having an initial thickness of 0.25 mm. Immediately after casting, the membrane was immersed into a water bath (30° C.) for 30 minutes.

The water wet membrane was subjected to a tap water flux measurement. Under 0.2 MPa tap water pressure, the membrane gave an initial tap water flux 3995 L/(m²·h). After 120 minutes, the tap water flux decreased to 1371 L/(m²·h).

Variation of the above preparation parameters results in CTFE/VC copolymer porous flat sheet membranes with different structures, suitable for filtration, membrane distillation, and pervaporation.

Example 8

Preparation of VC/CTFE Copolymer Porous Hollow Fiber Membrane

This example is presented to illustrate the preparation of CTFE/VC copolymer porous hollow fiber membrane.

15.1 g of CTFE/VC copolymer from Example 2 and 10.3 g of polyvinyl pyrrolidone (PVP, $M_w$ 3500, K12) were dissolved in 75.8 g of N,N-dimethyl acetamide (DMAc) to form a hollow fiber spinning dope. The spinning dope was extruded at a flow rate of 2.3 mL/min through a spinneret at 50° C. spinning temperature. A bore fluid containing 10% by weight of water in DMAc was injected to the bore of the fiber at a flow rate of 1.0 mL/min simultaneously with extruding of the spinning dope. The nascent fiber travelled through an air gap length of 0.5 cm at room temperature with a humidity of 40%, and then was immersed into a water coagulant bath at 25° C. The water-wet fiber was then sequentially exchanged with methanol for three times and for 30 minutes each time to obtain CTFE/VC copolymer hollow fiber membrane.

Variation of the above preparation parameters results in CTFE/VC copolymer porous hollow fiber membranes with different structures, suitable for filtration, membrane distillation, pervaporation.

Example 9

Preparation of CTFE/VC Copolymer Coatings

This example is presented to illustrate the preparation of CTFE/VC copolymer coatings.

10.3 g of CTFE/VC copolymer from Example 2 was dissolved in 90.8 g of tetrahydrofuran (THF) to form a coating solution. A glass plate was dip-coated in the coating solution. The glass plate was air-dried overnight, and then dried at 50° C. for 24 hours to obtain a CTFE/VC copolymer coating.

Example 10

Preparation of CTFE/VC Copolymer Films

This example is presented to illustrate the preparation of CTFE/VC copolymer films.

10.1 g of CTFE/VC copolymer from Example 2 was dissolved in 30.2 g of tetrahydrofuran (THF). The solution was cast on a glass plate using a doctor's knife with an initial thickness of 0.20 mm. The film on the glass plate was left in air overnight, and then dried under vacuum (29 in. Hg) at 50° C. for 24 hours. The dried CTFE/VC copolymer film had a thickness of 0.035 mm.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

The invention claimed is:

1. A process of making copolymers or terpolymers comprising chlorotrifluoroethylene (CTFE) monomeric units and vinyl chloride (VC) monomeric units and optionally one or more third monomeric units, said process comprising:
   (a) providing an initial reaction medium containing CTFE monomers and VC monomers in a CTFE:VC weight ratio of from about 50:50 to about 5:95; and
   (b) reacting said CTFE monomers and said VC monomers by introducing to the reaction medium said CTFE monomers and said VC monomers under conditions to produce a copolyomer or terpolymer comprising VC monomeric units in a weight percentage (based on the total weight of the copolymer or terpolymer produced) that is within 2 percent of the weight of said VC monomers introduced to the reaction medium (based on the total of monomers introduced to the reaction medium), wherein said conditions include conducting said reaction at temperatures in the range of from about 20° C. to about 50° C. for a period of at least about 15 hours to produce a copolymer having a glass transition temperature of from about 70° C. to about 87° C.

2. The process of claim 1 wherein the copolymer or the terpolymer has a Tg of from about 75° C. to about 87° C., a weight average molecular weight from about 100,000 to about 300,000 Daltons, and a surface energy from about 32 to about 38 mJ/m².

* * * * *